United States Patent
Uehara

(10) Patent No.: US 10,491,051 B2
(45) Date of Patent: Nov. 26, 2019

(54) POWER RECEPTION DEVICE, POWER TRANSMISSION DEVICE, POWER SUPPLY SYSTEM, AND POWER RECEPTION METHOD

(71) Applicant: LAPIS Semiconductor Co., Ltd., Yokohama (JP)

(72) Inventor: Teruaki Uehara, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 79 days.

(21) Appl. No.: 15/684,275

(22) Filed: Aug. 23, 2017

(65) Prior Publication Data

US 2018/0062452 A1    Mar. 1, 2018

(30) Foreign Application Priority Data

Aug. 25, 2016 (JP) ................. 2016-164407

(51) Int. Cl.
- *H02J 7/00* (2006.01)
- *H02J 50/80* (2016.01)
- *H02J 50/10* (2016.01)
- *H02J 7/02* (2016.01)
- *H04B 5/00* (2006.01)

(52) U.S. Cl.
CPC .............. *H02J 50/80* (2016.02); *H02J 7/007* (2013.01); *H02J 7/025* (2013.01); *H02J 50/10* (2016.02); *H04B 5/0037* (2013.01); *H02J 2007/0098* (2013.01)

(58) Field of Classification Search
CPC .. H02J 50/80; H02J 50/10; H02J 7/007; H02J 7/025; H04B 5/0037
USPC .......................................... 320/108; 307/104
See application file for complete search history.

(56) References Cited

U.S. PATENT DOCUMENTS

| | | | | |
|---|---|---|---|---|
| 2010/0013319 | A1* | 1/2010 | Kamiyama | H02J 7/025 307/104 |
| 2012/0326661 | A1* | 12/2012 | Kada | H01M 10/44 320/108 |
| 2013/0038272 | A1* | 2/2013 | Sagata | B60L 3/12 320/106 |

FOREIGN PATENT DOCUMENTS

JP    2015-033246 A    2/2015

* cited by examiner

*Primary Examiner* — Zixuan Zhou
(74) *Attorney, Agent, or Firm* — Rabin & Berdo, P.C.

(57) ABSTRACT

A power reception device includes a communication circuit for transmitting an information packet that includes a status parameter indicating the status of the battery and a request parameter indicating the amount of transmission power and a transmission time; a power reception circuit for receiving power and charging the battery; and a switching circuit for switching between the communication circuit and the power reception circuit, to connect a power reception coil to one of the communication circuit and the power reception circuit. The communication circuit includes determination circuit for determining the voltage of the battery; and a power reception control circuit for setting values corresponding to the voltage of the battery as the status parameter and the request parameter when the voltage of the battery is equal to or higher than a voltage threshold, and for setting fixed values as the parameters when the voltage of the battery is lower than the threshold.

1 Claim, 6 Drawing Sheets

POWER RECEPTION DEVICE, POWER TRANSMISSION DEVICE, POWER SUPPLY SYSTEM, AND POWER RECEPTION METHOD

BACKGROUND OF THE INVENTION

1. Field of the Invention

The present invention relates to a power reception device, a power transmission device, a power supply system, and a power reception method.

2. Description of the Related Art

In recent years, short range radio communications by NFC (Near Field Communications) are in widespread use. Using the short range radio communications, power supply systems that supply power (transmit power) in a non-contact manner are studied. In such a power supply system, a power transmission device and a power reception device, in general, each have a microprocessor (CPU) to control its operation with a program. The microprocessor, which is used for executing complex communication protocols, programmably controls the protocols.

The operable voltage of the microprocessor is generally specified. The microprocessor cannot operate in an extremely low power state in which the amount of charge remaining in a battery is lower than the operable voltage. Even when starting charging, the voltage of the battery stays low for some time after the start of charging, because all received power is received by the battery. Therefore, the power supply system that controls the non-contact charging using the short range radio communications by the operation of the microprocessors has a problem that the non-contact charging cannot be performed from a state in which the amount of charge remaining in the battery is 0 or extremely low.

To solve this problem, a radio power transmission system in which a power reception device has a CPU to control radio charging, independently of a CPU (microprocessor) to control information communication, was considered (for example, Japanese Patent Application Laid-Open No. 2015-33246). There was also considered a radio power supply system that performs charging in a method not predicated on the operation of a CPU, using minimum communication protocols compliant with communication standards.

Providing a plurality of CPUs (microprocessors), just as with the conventional technique described above, requires an additional programmable ROM and data RAM to operate the additional microprocessor, besides an increase in the number of the CPUs themselves, thus causing increases in cost and chip size.

When charging is performed using the minimum communication protocols, a maximum non-contact charging ability in the short range radio communications cannot be used, thus requiring a long time for charging.

To solve the above-described problems, the present invention has an object to provide a power supply system that can charge a battery in a short time from a state in which the voltage level of the battery is extremely low, while preventing an increase in the dimensions of devices.

SUMMARY OF THE INVENTION

A power reception device according to one aspect of the present invention has a power reception coil, and charges a battery with received power, while switching between transmission and reception of information packets between a power transmission coil of a power transmission device and the power reception coil. The power reception device includes: a communication circuit s for transmitting the information packet that includes a status parameter indicating a status of the battery and a request parameter indicating an amount of transmission power and a transmission time required of the power transmission device to the power transmission device; a power reception circuit for receiving the power and charging the battery with the received power; and a switching circuit for switching between the communication circuit and the power reception circuit, to connect the power reception coil to one of the communication circuit and the power reception circuit. The communication circuit includes: a determination circuit for determining a voltage value of the battery; and a power reception control circuit for setting values corresponding to the voltage value of the battery as the status parameter and the request parameter when the voltage value of the battery is equal to or higher than a voltage threshold value, and for setting fixed values as the status parameter and the request parameter when the voltage value of the battery is lower than the voltage threshold value.

A power transmission device according to one aspect of the present invention has a power transmission coil, and performs transmission and reception of information packets to and from a power reception device having a power reception coil, while switching between the transmission and reception of the information packets. The power transmission device includes: a communication circuit for receiving the information packet that includes a status parameter indicating a status of a battery of the power reception device and a request parameter indicating an amount of transmission power and a transmission time required by the power reception device from the power reception device, and setting a power transmission parameter on the basis of the status parameter and the request parameter; a power transmission circuit for transmitting power in accordance with the power transmission parameter; and a switching circuit for switching between the communication circuit and the power transmission circuit, to connect the power transmission coil to one of the communication circuit and the power transmission circuit. The communication circuit includes integration circuit for integrating the transmission time of each transmission by the power transmission circuit to obtain an integrated value. When the communication circuit has received the same values for a plurality of times as the status parameter and the request parameter from the power reception circuit and the integrated value has become equal to or higher than a set value, the power transmission circuit stops transmitting the power.

A power supply system according to one aspect of the present invention includes a power transmission device having a power transmission coil and a power reception device having a power reception coil, and performs transmission and reception of information packets between the power transmission coil and the power reception coil, while switching between the transmission and reception of the information packets. The power reception device includes a power reception side communication circuit for transmitting the information packet that includes a status parameter indicating a status of the battery and a request parameter indicating an amount of transmission power and a transmission time required of the power transmission device to the power transmission device; a power reception circuit for receiving the power from the power transmission device and charging the battery with the received power; and a power reception side switching circuit for switching between the power reception side communication circuit and the power reception circuit, to connect the power reception coil to one of the power reception side communication circuit and the power reception circuit. The power transmission device includes a power transmission side communication circuit for receiving the information packet that includes the status parameter and the request parameter from the power reception device, and setting a power transmission parameter on the basis of the status parameter and the request parameter; a power transmission circuit for transmitting power in accordance with the power transmission parameter; and a power transmission side switching circuit for switching between the power transmission side communication circuit and the power transmission circuit, to connect the power transmission coil to one of the power transmission side communication circuit and the power transmission circuit. The power reception side communication circuit of the power reception device includes a determination circuit for determining a voltage value of the battery; and a power reception control circuit for setting values corresponding to the voltage value of the battery as the status parameter and the request parameter when the voltage value of the battery is equal to or higher than a voltage threshold value, and for setting fixed values as the status parameter and the request parameter when the voltage value of the battery is lower than the voltage threshold value.

A power reception method according to one aspect of the present invention is a power reception method for a power reception device that includes a power reception coil, a communication circuit, a power reception circuit, and a switching circuit. The power reception device performs transmission and reception of information packets between a power transmission coil of a power transmission device and the power reception coil, while switching between the transmission and reception of the information packets, and charges a battery with received power. The communication circuit performs the steps of determining a voltage value of the battery; setting values corresponding to the voltage value of the battery as a status parameter, which indicates a status of the battery, and a request parameter, which indicates an amount of transmission power and a transmission time required of the power transmission device, when the voltage value of the battery is equal to or higher than a voltage threshold value, and setting fixed values as the status parameter and the request parameter when the voltage value of the battery is lower than the voltage threshold value; and transmitting the information packet including the status parameter and the request parameter to the power transmission device. The switching circuit performs the steps of connecting the power reception coil to the power reception circuit, after the communication circuit has transmitted the status parameter and the request parameter; and connecting the power reception coil to the communication circuit, after the power reception from the power transmission device has been completed.

The present invention allows charging the battery in a short time from a state in which the voltage level of the battery is extremely low, while preventing an increase in the dimensions of the devices.

DETAILED DESCRIPTION OF THE INVENTION

Embodiments of the present invention will be described below in detail with reference to the drawings.

Figure 1:
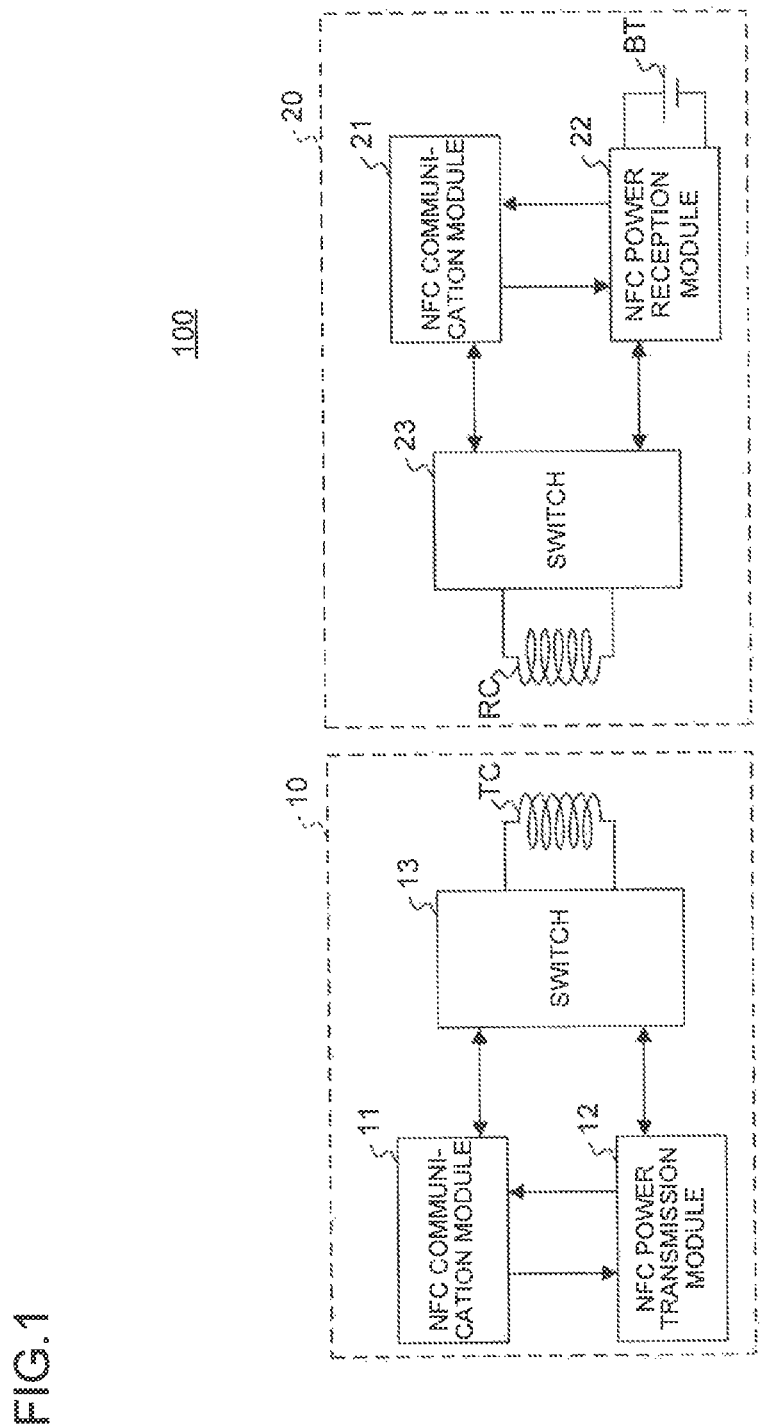
FIG. 1 is a block diagram showing a configuration of a power supply system.

FIG. 1 is a block diagram showing a configuration of a power supply system 100 according to the present invention.

The power supply system 100 is constituted of a power transmission device 10 and a power reception device 20. The power transmission device 10 has a power transmission coil TC. The power reception device 20 has a power reception coil RC.

The power transmission device 10 and the power reception device 20 exchange information between the power transmission coil TC and the power reception coil RC by short range radio communications (hereinafter also called NFC (Near Field Communications)) using, for example, electromagnetic waves of 13.56 MHz. The power transmission device 10 and the power reception device 20 perform the information exchange by transmissions and receptions of information packets using, for example, Type-F packets, which are one type of NFC packet standards.

The power transmission device 10 and the power reception device 20 also perform electric power transmission and power reception in a non-contact manner between the power transmission coil TC and the power reception coil RC by, for example, electromagnetic field resonance. In the following description, the power transmission and the power reception are also collectively called power supply or power transfer.

Since signals used for the power supply or power transfer have larger amplitudes than signals for the information exchange, the information exchange cannot be performed while performing the power supply. Therefore, the power transmission device 10 and the power reception device 20 perform the power supply and the information exchange in a switching manner.

The power supply is constituted of repetitions of a transmission and reception of the information packets about the settings of the power supply (for example, a transmission of a status parameter indicating the status of a battery BT of the power reception device 20) and a subsequent short-time power transmission and reception. In the following description, a power transmission time for the single power transmission is referred to as a unit power transmission time. Note that, in the setting of a request parameter by a normal charge power reception control circuit 45 as described below, the unit power transmission time can be set depending on variations in the voltage level of the battery BT of the power reception device 20.

The power transmission device 10 includes an NFC communication module 11, an NFC power transmission module 12, a switch 13, and the power transmission coil TC.

The NFC communication module 11 transmits and receives the information packets to and from another device (the power reception device 20 in this embodiment) situated near the power transmission device 10. The NFC communication module 11 transmits and receives the information packets (hereinafter referred to as power transmission packets) about the settings of the power supply, and transmits and receives normal information packets (hereinafter referred to as normal packets) other than the power transmission packets.

As the power transmission packets, the NFC communication module 11 transmits a status check packet to check the status of the battery of the power reception device 20. In response to the status check packet, the NFC communication module 11 receives a status parameter (for example, the charged ratio of the battery or remaining battery capacity, or the like), which indicates the status of the battery of the power reception device 20, transmitted from the power reception device 20, and a request parameter, which indicates the amount of power and a power transmission time (i.e. unit power transmission time) required by the power reception device 20.

The NFC communication module 11 transmits the status check packet, whenever the NFC power transmission module 12 completes a power transmission for the unit power transmission time. Thus, the transmission and reception of the status check packet, the status parameter, and the request parameter and the power supply are performed alternately.

Figure 2:
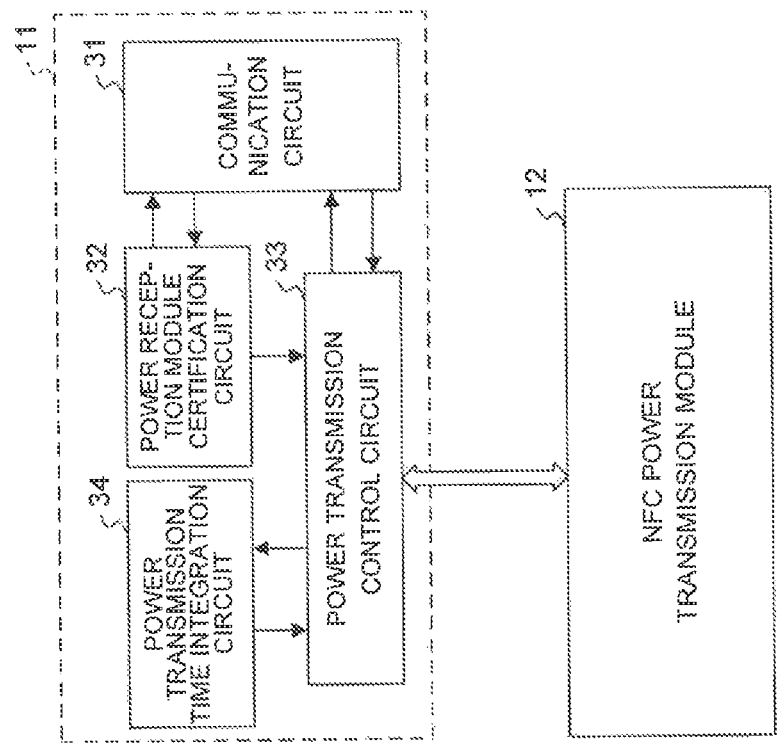
FIG. 2 is a block diagram showing a configuration of an NFC communication module for a power transmission device.

FIG. 2 is a block diagram showing the configuration of the NFC communication module 11. The NFC communication module 11 includes a communication circuit 31, a power reception module certification circuit 32, a power transmission time integration circuit 34, and a power transmission control circuit 33.

The communication circuit 31 transmits and receives polling packets, which make inquiries to peripheral devices, certification packets, which are used for certification of a communication counterpart or partner device, ability check packets, which are used for checking whether or not the partner device is compliant with power supply by NFC, and the like, to and from the partner device (e.g., the power reception device 20 in this embodiment). The communication circuit 31 transmits the status check packet, and receives the status parameter and the request parameter.

The power reception module certification circuit 32 certifies the partner device, on the basis of the certification packet received by the communication circuit 31. The power reception module certification circuit 32 checks whether or not the partner device is compliant with power supply by NFC, on the basis of the ability check packet received by the communication circuit 31.

The power transmission control circuit 33 sets a power transmission parameter on the basis of the status parameter and the request parameter received by the communication circuit 31. The power transmission parameter includes, for example, information on the unit power transmission time (i.e., transmission time of each power transmission) and the amount of power to be transmitted by the NFC power transmission module 12. The power transmission control circuit 33 commands the NFC power transmission module 12 to perform a power transmission in accordance with the set power transmission parameter. At this time, after the power transmission is performed for the unit power transmission time in accordance with the set power transmission parameter, the communication circuit 31 transmits a status check packet again and receives a status parameter and a request parameter again, and thus the power transmission control circuit 33 sets a power transmission parameter again. Therefore, the NFC power transmission module 12 is controlled so as to repeat power transmissions.

The power transmission time integration circuit 34 calculates an integrated value of the unit power transmission times of the power transmissions by the NFC power transmission module 12.

The integrated value is used for determining an error in the battery BT of the power reception device 20 during the power supply. In other words, the power transmission control circuit 33 determines whether or not the integrated value of the unit power transmission times of the power transmissions in accordance with the same transmission parameter exceeds a set time. When the integrated value exceeds the set time, the battery BT of the power reception device 20 is determined to have a battery error (in other words, a voltage level does not rise even when the battery charging is performed), and the power transmission control circuit 33 controls the communication circuit 31 and the NFC power transmission module 12 to stop transmission of a status check packet and a power transmission.

Referring to FIG. 1 again, the NFC power transmission module 12 performs a power transmission in accordance with a power transmission parameter under control of the power transmission control circuit 33.

The switch 13 switches between the NFC communication module 11 and the NFC power transmission module 12 to connect one of the NFC communication module 11 and the NFC power transmission module 12 to the power transmission coil TC, in accordance with whether to perform a transmission and reception of information packets to and from the power reception device 20 or to perform a power transmission to the power reception device 20.

Figure 3:
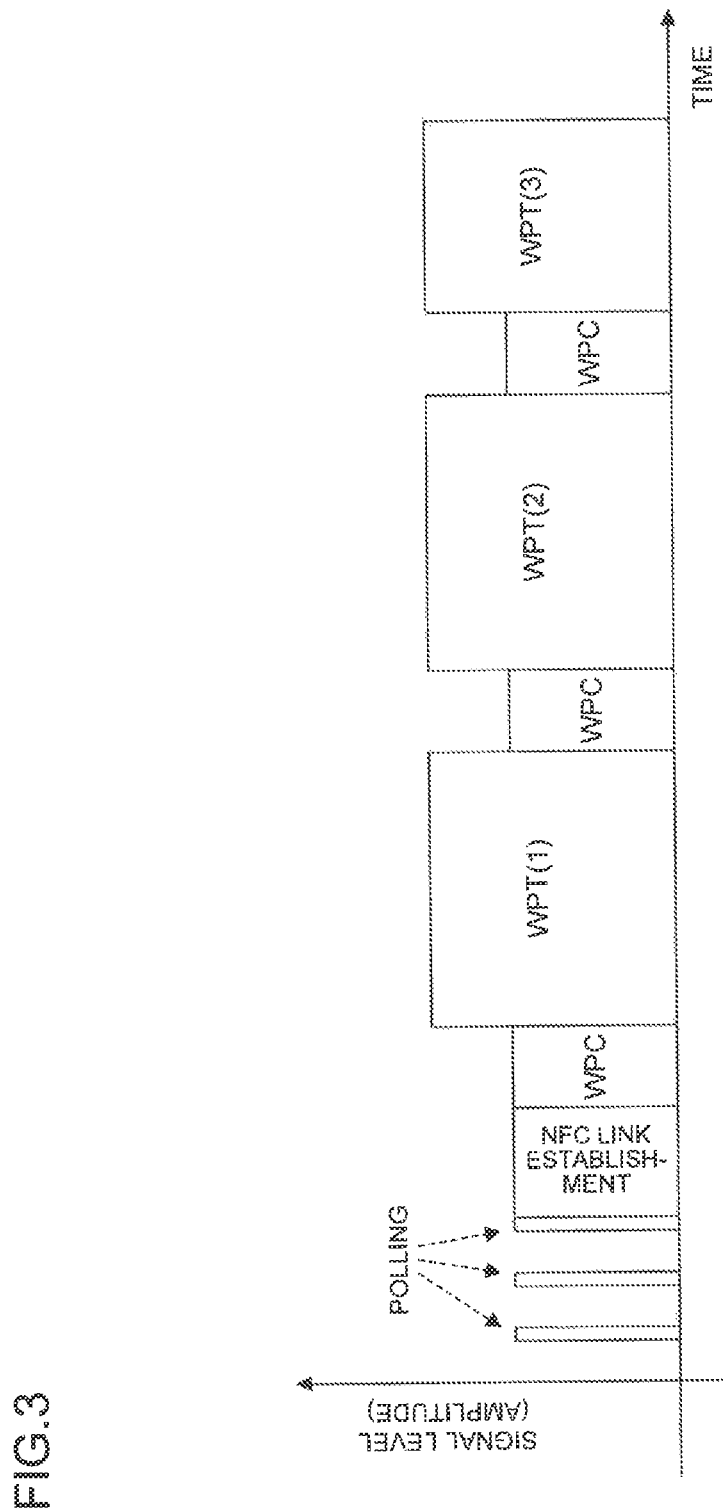
FIG. 3 is a graph of an overview of signals during power transmissions.

FIG. 3 is a graph of an overview of signals to be transmitted when the power transmission device 10 performs power transmissions. The communication circuit 31 of the NFC communication module 11 first makes inquiries to peripheral devices by transmitting and receiving polling packets to confirm the existence of the power reception device 20. The NFC communication module 11 transmits and receives certification packets and ability check packets to and from the power reception device 20, and establishes connection of short range radio communications with the power reception device 20 (indicated by "NFC link establishment" in the drawing). The NFC communication module 11 transmits a status check packet to the power reception device 20, and receives a power transmission packet including a status parameter and a request parameter from the power reception device 20 (indicated by "WPC" in the drawing). The NFC communication module 11 sets a power transmission parameter in accordance with the status parameter and the request parameter, and the NFC power transmission module 12 performs a power transmission in accordance with the set power transmission parameter (indicated by "WPT(1)" in the drawing). Whenever the NFC communication module 11 transmits a status check packet and receives a status parameter and a request parameter, the NFC power transmission module 12 performs a power transmission in a repeated manner (indicated by "WPT(2)" and "WPT(3)" in the drawing).

Referring to FIG. 1 again, the power reception device 20 includes an NFC communication module 21, an NFC power reception module 22, a switch 23, the power reception coil RC, and the battery BT.

The NFC communication module 21 transmits and receives information packets to and from another device (i.e., the power transmission device 10 in this embodiment)

situated near the power reception device 20. The NFC communication module 21 transmits and receives power transmission packets, as well as normal packets.

Figure 4:
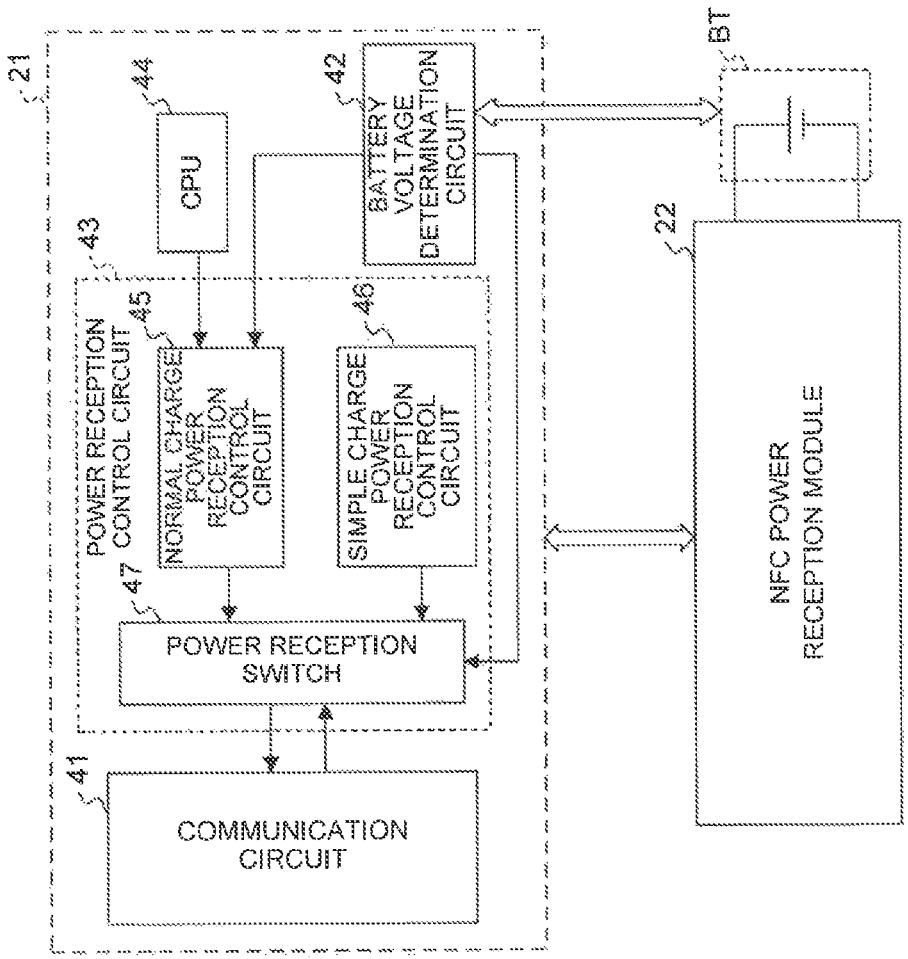
FIG. 4 is a block diagram showing a configuration of an NFC communication module for a power reception device.

FIG. 4 is a block diagram showing the configuration of the NFC communication module 21. The NFC communication module 21 includes a communication circuit 41, a battery voltage determination circuit 42, a power reception control circuit 43, and a CPU 44.

The communication circuit 41 transmits and receives polling packets, certification packets, ability check packets, and the like. The communication circuit 41 receives a status check packet, and transmits a status parameter and a request parameter in response thereto.

The battery voltage determination circuit 42 determines the voltage level of the battery BT, and provides a determination result to the power reception control circuit 43.

The CPU 44 controls the operation of each component of the NFC communication module 21. The CPU 44 controls the communication operation of the normal charge power reception control circuit 45.

The power reception control circuit 43 sets a status parameter and a request parameter. By transmitting the status parameter and the request parameter through the communication circuit 41, the power reception control circuit 43 controls power that the NFC power reception module 22 receives from the power transmission device 10 (i.e. power reception control). The power reception control circuit 43 includes the normal charge power reception control circuit 45, a simple charge power reception control circuit 46, and a power reception switch 47.

The normal charge power reception control circuit 45 sets a status parameter and a request parameter under control of the CPU 44. For example, the normal charge power reception control circuit 45 calculates the amount of power and a power transmission time required for efficiently charging the battery BT in accordance with the voltage level of the battery BT determined by the battery voltage determination circuit 42, and sets the request parameter. For example, the unit power transmission time is varied with variations in the voltage level of the battery BT. The normal charge power reception control circuit 45 calculates a battery charged ratio (i.e. remaining battery capacity) on the basis of the voltage level of the battery BT determined by the battery voltage determination circuit 42, and sets the battery charged ratio as the status parameter.

On the other hand, the simple charge power reception control circuit 46 sets fixed values as the status parameter and the request parameter. In other words, the simple charge power reception control circuit 46 sets the predetermined values as the status parameter and the request parameter, in contrast to the normal charge power reception control circuit 45 that sets the status parameter and the request parameter in accordance with the voltage level of the battery BT. Thus, the request parameter indicates the same amount of power and the same unit power transmission time, even when the voltage level of the battery BT varies. Since the simple charge power reception control circuit 46 operates as a hardware unit and does not presuppose control by the CPU 44, the simple charge power reception control circuit 46 can set the status parameter and the request parameter even in a condition that the CPU 44 cannot operate due to an extremely low voltage level of the battery BT.

The power reception switch 47 switches between the normal charge power reception control circuit 45 and the simple charge power reception control circuit 46 to connect the communication circuit 41 to one of the normal charge power reception control circuit 45 and the simple charge power reception control circuit 46, depending on whether or not the voltage level of the battery BT determined by the battery voltage determination circuit 42 is equal to or higher than a predetermined voltage threshold value. To be more specific, when the voltage level of the battery BT is equal to or higher than the voltage threshold value, the power reception switch 47 connects the normal charge power reception control circuit 45 to the communication circuit 41. When the voltage level of the battery BT is lower than the voltage threshold value, the power reception switch 47 connects the simple charge power reception control circuit 46 to the communication circuit 41.

The voltage threshold value is determined on the basis of a lower limit of an operating voltage (hereinafter referred to as an operable voltage) of the CPU 44. In other words, when the voltage value of the battery BT is equal to or higher than the operable voltage of the CPU 44, the CPU 44 is in an operable state, and thus the normal charge power reception control circuit 45 can set the request parameter in accordance with the voltage level of the battery BT under control of the CPU 44. Therefore, the power reception control circuit 43 connects the normal charge power reception control circuit 45 to the communication circuit 41, and hence the status parameter and the request parameter are set at values corresponding to the voltage level of the battery BT.

On the contrary, when the voltage value of the battery BT is lower than the operable voltage of the CPU 44, the CPU is in an inoperable state, and thus the normal charge power reception control circuit 45 cannot set the request parameter under control of the CPU 44. Therefore, the power reception control circuit 43 connects the simple charge power reception control circuit 46 to the communication circuit 41, and hence the status parameter and the request parameter are set at fixed values.

Referring to FIG. 1 again, the NFC power reception module 22 receives power transmitted from the power transmission device 10 and charges the battery BT.

The switch 23 switches between the NFC communication module 21 and the NFC power reception module 22 to connect one of the NFC communication module 21 and the NFC power reception module 22 to the power reception coil RC, depending on whether a transmission and reception of information packets to and from the power transmission device 10 or a power transmission from the power transmission device 10 is performed.

Figure 5:
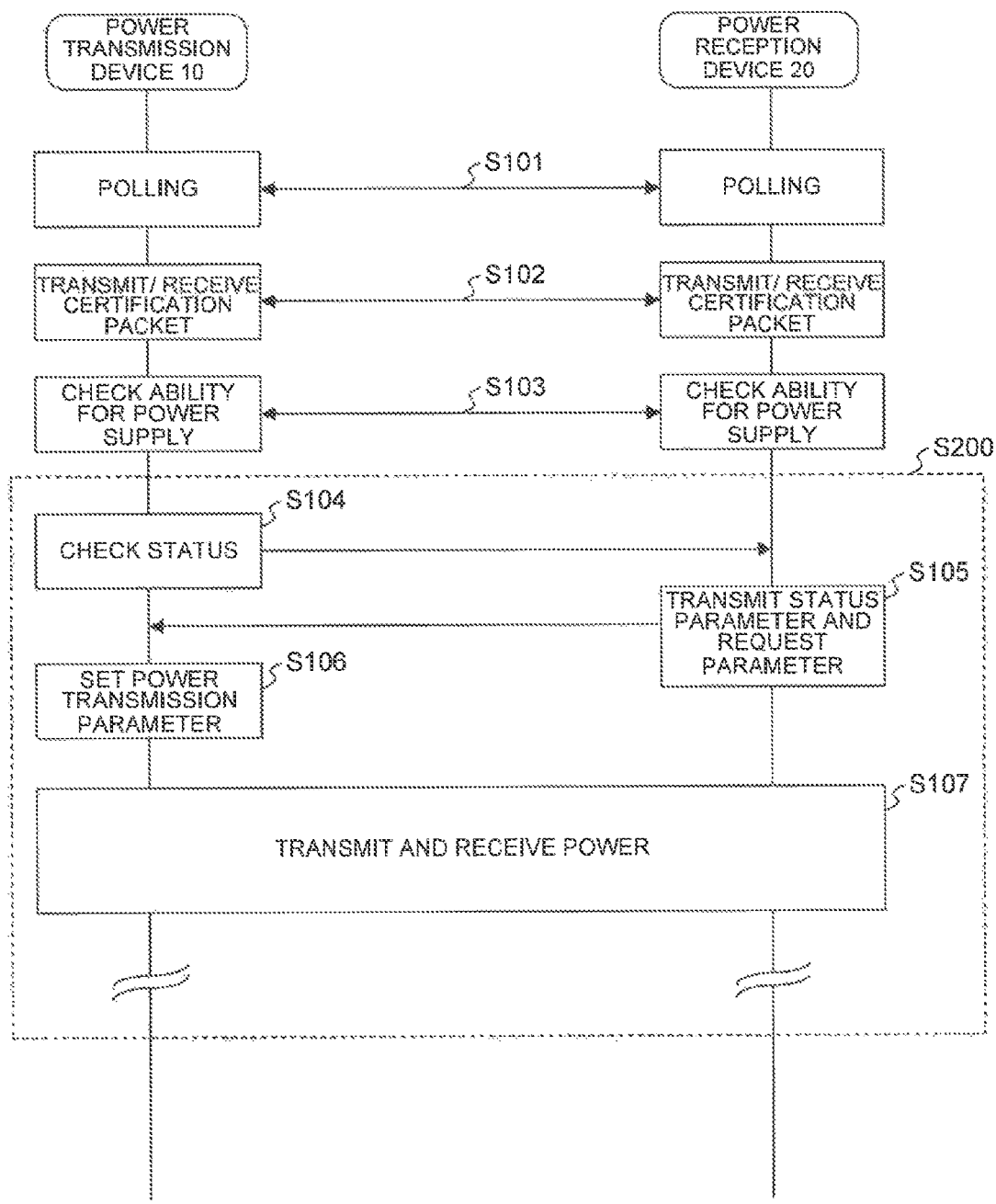
FIG. 5 is a sequence diagram showing an operation of the power transmission device and the power reception device.

Next, the operation of the power transmission device 10 and the power reception device 20 will be described with reference to a sequence diagram of FIG. 5.

First, the power transmission device 10 and the power reception device 20 transmit and receive polling packets to and from each other to perform polling (step S101).

The power transmission device 10 and the power reception device 20 transmit and receive certification packets to and from each other to certify partner devices (step S102).

The power transmission device 10 and the power reception device 20 transmit and receive ability check packets to and from each other to check whether or not the partner devices are compliant with power supply by NFC (step S103).

The above-described operation establishes connection between the power transmission device 10 and the power reception device 20.

Next, the power transmission device 10 transmits a status check packet to check the status of the battery BT of the power reception device 20 (step S104).

In response to the status check packet transmitted from the power transmission device 10, the power reception device 20 transmits a status parameter and a request parameter (step S105). As described above, when the voltage level of the battery BT is lower than a voltage threshold value, the power reception device 20 transmits fixed values as the status parameter and the request parameter. On the other hand, when the voltage level of the battery BT is equal to or higher than the voltage threshold value, the power reception device 20 transmits values corresponding to the voltage level of the battery BT as the status parameter and the request parameter.

The power transmission device 10 receives the status parameter and the request parameter, and sets a power transmission parameter based thereon (step S106).

The power transmission device 10 transmits power in accordance with the set power transmission parameter. The power reception device 20 charges the battery BT with the power received thereby (step S107).

After that, the operation of steps S104 to S107 (indicated as step S200 in the drawing) is repeated.

Next, the operation of the power transmission device 10 and the power reception device 20 will be described with reference to a flowchart of FIG. 6, when the voltage level of the battery BT is lower than the voltage threshold value. Note that, the following description describes operation corresponding to S200, though omitting operation corresponding to S101 to S103 of FIG. 5.

The power transmission device 10 transmits a status check packet (step S201).

Since the voltage level of the battery BT is lower than the voltage threshold value, the power reception device 20 transmits fixed values set as the status parameter and the request parameter to the power transmission device 10 (step S202).

Upon receiving the status parameter and the request parameter, the power transmission device 10 sets a power transmission parameter on the basis of these parameters. Since the status parameter and the request parameter have the fixed values, the power transmission parameter also has a fixed value (step S203).

The power transmission device 10 transmits power in accordance with the set power transmission parameter. The power reception device 20 charges the battery BT with the received power. Since the power transmission parameter has the fixed value, the power transmission device 10 transmits power of a fixed power level (in other words, performs a simple power transmission) in accordance with the power transmission parameter (step S204).

The power transmission device 10 determines whether or not an integrated power transmission time has exceeded a set time (step S205). When the integrated power transmission time is determined to have exceeded the set time, a battery error is determined to be occurring and thus the operation is stopped (error stop).

On the other hand, when the integrated power transmission time is not determined to have exceeded the set time, the power transmission device 10 transmits a status check packet again (step S206).

The power reception device 20 checks the voltage level of the battery BT (step S207), and determines whether or not the voltage level of the battery BT is equal to or higher than the voltage threshold value, i.e. the operable voltage of the CPU 44 (step S208). When the voltage level of the battery BT is determined to be lower than the voltage threshold value, the operation goes back to step S202, and the power reception device 20 transmits the fixed values again as the status parameter and the request parameter.

On the other hand, when the voltage level of the battery BT is determined to be equal to or higher than the voltage threshold value (the operable voltage of the CPU 44 or more), the power reception device 20 stops transmitting the status parameter and the request parameter.

Due to the absence of a response from the power reception device 20 to the status check packet transmitted in step S206, a timeout occurs in the power transmission device 10.

Figure 6:
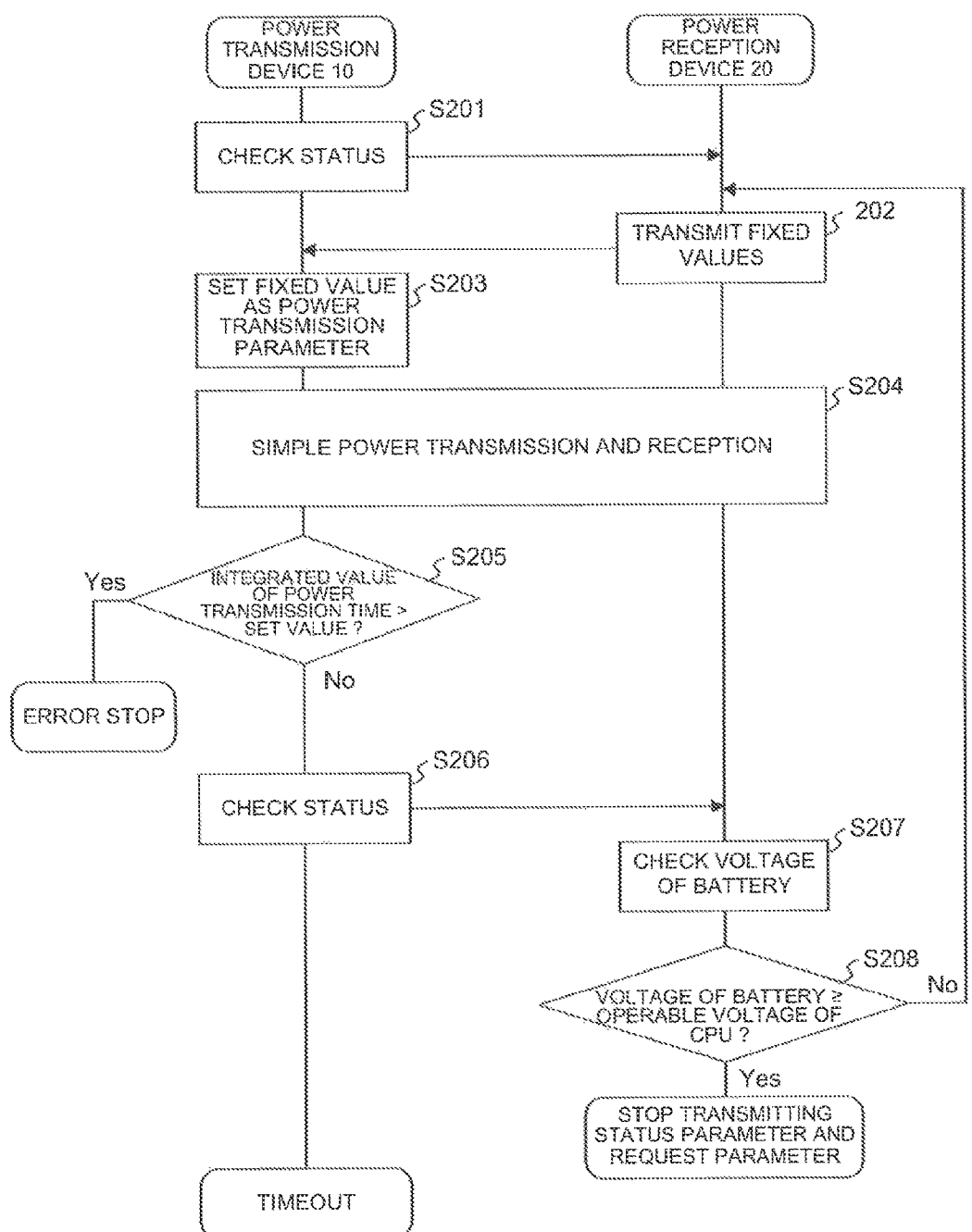
FIG. 6 is a sequence diagram showing the operation of the power transmission device and the power reception device during simple power transmissions.

Thus, the operation corresponding to step S202 of FIG. 6 is stopped. The operation goes back to step S102 of FIG. 5, and the power transmission device 10 and the power reception device 20 transmit and receive certification packets again. At this time, since the voltage level of the battery BT of the power reception device 20 is equal to or higher than the operable voltage of the CPU 44, the status parameter and the request parameter are set thereafter in accordance with the voltage level of the battery BT, and power supply is performed in accordance with the voltage level of the battery BT.

In the power supply system according to the present invention, as described above, the power reception device determines the voltage level of the battery. When the voltage level of the battery is lower than the operable voltage of the CPU, fixed values are set as the status parameter and the request parameter and transmitted to the power transmission device. The power transmission device transmits power while setting a fixed value as the power transmission parameter. Therefore, the battery is charged independent of the operation of the CPU (i.e. simple charging), thus allowing charging from a state in which the voltage level of the battery is extremely low.

When the voltage level of the battery of the power reception device changes from a state of being lower than the operable voltage of the CPU to a state of being equal to or higher than the operable voltage of the CPU, the power reception device stops transmitting the status parameter and the request parameter. Thus, a timeout occurs in the operation of the power transmission device, and the sequential operation is started again from the state in which the voltage level of the battery of the power reception device is equal to or higher than the operable voltage of the CPU. Therefore, even when the simple charging is started from a state in which the voltage level of the battery is extremely low, the normal charging can be performed on the way in accordance with the voltage level of the battery, and therefore it is possible to charge the battery in a short time from the state in which the voltage level of the battery is extremely low.

Note that, the present invention is not limited to the above-described embodiments. For example, in the above-described embodiment, the power transmission device 10 and the power reception device 20 transmit and receive the information packets using the Type-F packets. However, the information packets may be transmitted and received in accordance with other NFC communication standards.

The above-described embodiment describes a case where the power supply is performed by electromagnetic field resonance. However, a method for the power supply is not limited thereto, and another method such as electromagnetic induction method may be used instead.

The above-described embodiment describes a case in which the voltage threshold value is the lower limit of the operating voltage of the CPU 44 (operable voltage). However, a value of the lower limit of the operating voltage+α may be set as the voltage threshold value. This makes it possible to keep the voltage level of the battery at the lower limit of the operating voltage of the CPU 44 or more, even when the voltage level of the battery has once exceeded the voltage threshold value and thereafter dropped a little in a short time.

This application is based on a Japanese Patent Application No. 2016-164407 which is hereby incorporated by reference.

What is claimed is:

1. A power reception device comprising a power reception coil, the power reception device being configured to charge a battery with received power, while switching between transmission and reception of information packets between a power transmission coil of a power transmission device and the power reception coil, the power reception device comprising:
  a communication circuit for transmitting an information packet that includes a status parameter indicating a status of the battery and a request parameter indicating an amount of transmission power and a transmission time required of the power transmission device to the power transmission device;
  a power reception circuit for receiving the power and charging the battery with the received power; and
  a switch circuit for switching between the communication circuit and the power reception circuit, to connect the power reception coil to one of the communication circuit and the power reception circuit, wherein
the communication circuit includes:
  a determination circuit for determining a voltage value of the battery; and
  a power reception control circuit for setting values corresponding to the voltage value of the battery as the status parameter and the request parameter when the voltage value of the battery is equal to or higher than a voltage threshold value, and for setting fixed values as the status parameter and the request parameter when the voltage value of the battery is lower than the voltage threshold value, and
when the voltage value of the battery becomes equal to or higher than the voltage threshold value, after charging of the battery is started in a state in which the voltage value of the battery is lower than the voltage threshold value, the communication circuit stops transmitting the status parameter and the request parameter.

* * * * *